United States Patent [19]
Chen

[11] Patent Number: 5,778,752
[45] Date of Patent: Jul. 14, 1998

[54] SCROLL SAW HAVING A TILTABLE TABLE AND POSITIVE STOPS FOR SELECT ANGULAR POSITIONS OF THE TABLE

[75] Inventor: Ruey-Zon Chen, Taichung, Taiwan

[73] Assignee: Rexon Industrial Corp., Ltd., Taichung, Taiwan

[21] Appl. No.: 774,205

[22] Filed: Dec. 27, 1996

[51] Int. Cl.$^6$ .................................................. B27B 11/10
[52] U.S. Cl. ........................... 83/783; 83/581; 30/397
[58] Field of Search .......................... 83/783, 581, 784, 83/785, 786; 30/397

[56] References Cited

U.S. PATENT DOCUMENTS

| | | | |
|---|---|---|---|
| 4,241,634 | 12/1980 | Ambler | 83/581 |
| 4,355,557 | 10/1982 | Mecsey | 83/581 |
| 4,503,742 | 3/1985 | Sutton | 83/783 |
| 4,537,105 | 8/1985 | Bergler | 83/581 |
| 4,841,823 | 6/1989 | Brundage | 83/783 |
| 5,042,348 | 8/1991 | Brundage et al. | 83/581 |
| 5,176,059 | 1/1993 | Anderson | 83/783 |

Primary Examiner—Maurina T. Rachuba
Attorney, Agent, or Firm—McCormick, Paulding & Huber

[57] ABSTRACT

In a scroll saw, a motor is drivingly connected to the saw blade for reciprocating the blade, and a table defining an approximately planar work surface for supporting a workpiece is pivotally mounted on a frame with the saw blade extending through a slot formed in the table for cutting the workpiece. The work surface defines a first side extending laterally on one side of the blade, and a second side extending laterally on an opposite side of the blade relative to the first side, and the first and second sides of the work surface are each tiltable about the 0° plane through upper and lower angular segments of approximately 45°. An angular adjustment member is connected between the table and frame, and a plurality of stop surfaces are angularly spaced relative to each other in select angular locations on its lower edge. A stop member is urged by a coil spring into engagement with the lower edge of the adjustment member, and is engageable with each stop surface in response to pivotal movement of the table to thereby stop the adjustment member and table in the select angular positions. An adjustment knob extends through a slot formed in the angular adjustment member, and is threadedly attached to the frame for rotation into engagement with the adjustment member to thereby lock the selected position of the adjustment member and table in place.

18 Claims, 4 Drawing Sheets

SCROLL SAW HAVING A TILTABLE TABLE AND POSITIVE STOPS FOR SELECT ANGULAR POSITIONS OF THE TABLE

FIELD OF THE INVENTION

The present invention relates to sawing apparatus, and more particularly, to scroll saws of the type having a table for supporting a workpiece which is tiltable relative to an axis of the saw blade for cutting the workpiece at various angular orientations.

BACKGROUND INFORMATION

A typical prior art scroll saw comprises a frame having a base for supporting the saw, a motor mounted on the base which is drivingly connected to a saw blade for reciprocating the saw blade, and a table defining a planar work surface for supporting a workpiece. In a typical scroll saw, the table is pivotally mounted to the frame for tilting the table relative to the saw blade to thereby cut the workpiece at various angular orientations relative to the blade. An angular adjustment member is coupled between the table and the frame for adjusting the angular position of the table relative to the blade. A graduated scale is applied to the front face of the adjustment member, and a pointer is mounted adjacent to the scale to indicate the angular position of the table with reference to the scale. An adjustment knob is received through a curved slot in the adjustment member and is threadedly attached to the frame, and the knob is rotated into engagement with the adjustment member to fix the angular position of the adjustment member and table relative to the blade.

One of the drawbacks of this type of scroll saw is that an operator must accurately align the pointer with the correct graduation on the scale by "eyeballing" the pointer and scale in order to set the table at a desired angular position. This can be relatively difficult for operators that are far-sighted or that otherwise have poor vision. If the adjustment member and table are set at the wrong angular position, then the resulting work will likely have to be discarded. In addition, it can be relatively time consuming to visually align the pointer with the correct graduation of the scale, and to in turn lock the position of the table at the selected angular position.

Accordingly, it is an object of the present invention to provide a scroll saw which overcomes the drawbacks and disadvantages of the above-described scroll saws and which has stops for positioning and locating the table in select angular positions.

SUMMARY OF THE INVENTION

The present invention is directed to a scroll saw comprising a frame, an axially-elongated saw blade drivingly supported on the frame for cutting a workpiece, and an approximately planar work surface pivotally mounted on the frame adjacent to the saw blade for supporting the workpiece, and tiltable relative to the saw blade for cutting the workpiece at various angular positions relative to the axis of the blade. An angular adjustment member is coupled between the work surface and frame, and forms a plurality of stop surfaces angularly spaced relative to each other and defining a plurality of select positions of the work surface relative to the blade. A stop member is mounted adjacent to the angular adjustment member and is engageable with each stop surface in response to pivotal movement of the table for stopping the adjustment member and table in the respective angular position relative to the blade.

In a preferred embodiment of the invention, the stop member is urged by a spring or like biasing member into engagement with a lower edge of the angular adjustment member forming the stop surfaces. Each stop surface is preferably formed by a respective recess in the edge of the adjustment member, and each recess defines a curvature substantially conforming to the curvature of the stop member.

A graduated scale is applied to or otherwise mounted on or adjacent to the angular adjustment member, and each graduation defines a respective angular position of the work surface relative to either the 0° plane or the axis of the saw blade. An index is mounted adjacent to the graduated scale, and based on the graduation(s) aligned with the index, the index and scale provide the angular position of the work surface relative to either the axis of the saw blade or the 0° plane. In the embodiment of the invention wherein the left and right sides of the table are each tiltable in opposite directions about the 0° plane, the select angular positions of the stop surfaces are preferably at 0°, and 15°, 30° and 45° relative to the 0° plane for each side of the table.

One advantage of the scroll saw of the present invention is that when the table is tilted relative to the saw blade, the stop member engages each stop surface, and in turn stops the angular adjustment member and table in each of the select angular positions. Accordingly, when setting the table in one of the select angular positions, the operator is not required to read or otherwise make an adjustment of the table with reference to the scale. Rather, the stop member automatically engages each stop surface, and thereby stops the table in each select angular position. In addition, the stop member preferably makes a clicking sound when it engages each stop surface to notify the operator that the table is located in a select angular position. This may be a significant advantage to individuals that are far-sighted or that cannot otherwise read the scale. Yet another advantage of the present invention is that it permits an operator to quickly and easily obtain a rough setting of the table, without reference to the scale, by tilting the table to the select angular position closest to the desired setting. The operator may then obtain the desired setting by making a fine adjustment of the table with reference to the scale.

Other objects and advantages of the present invention will become apparent in view of the following detailed description and accompanying drawings.

DETAILED DESCRIPTION OF A PREFERRED EMBODIMENT

Figure 1:
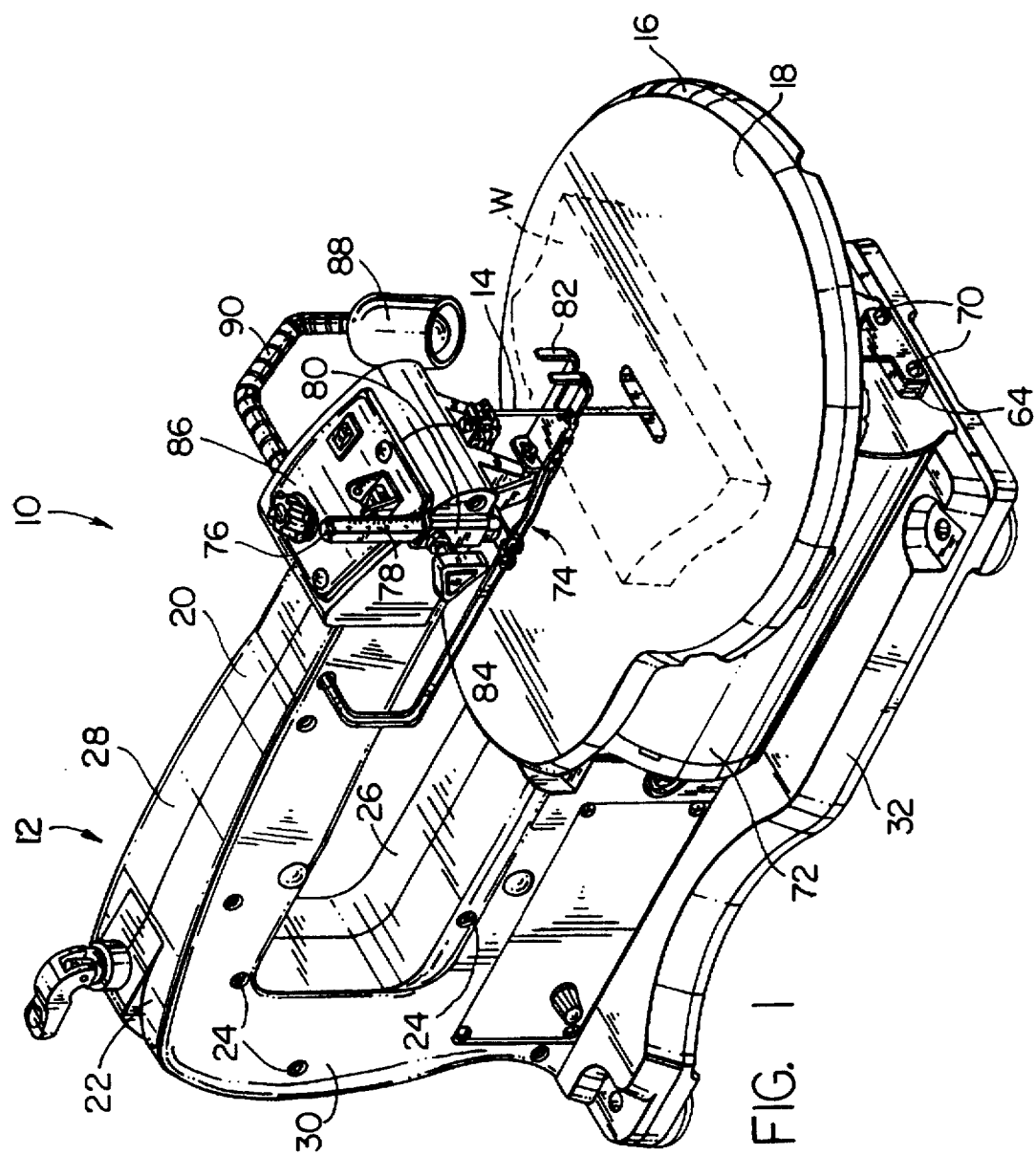
FIG. 1 is a perspective view of a scroll saw embodying the present invention.
Figure 2:
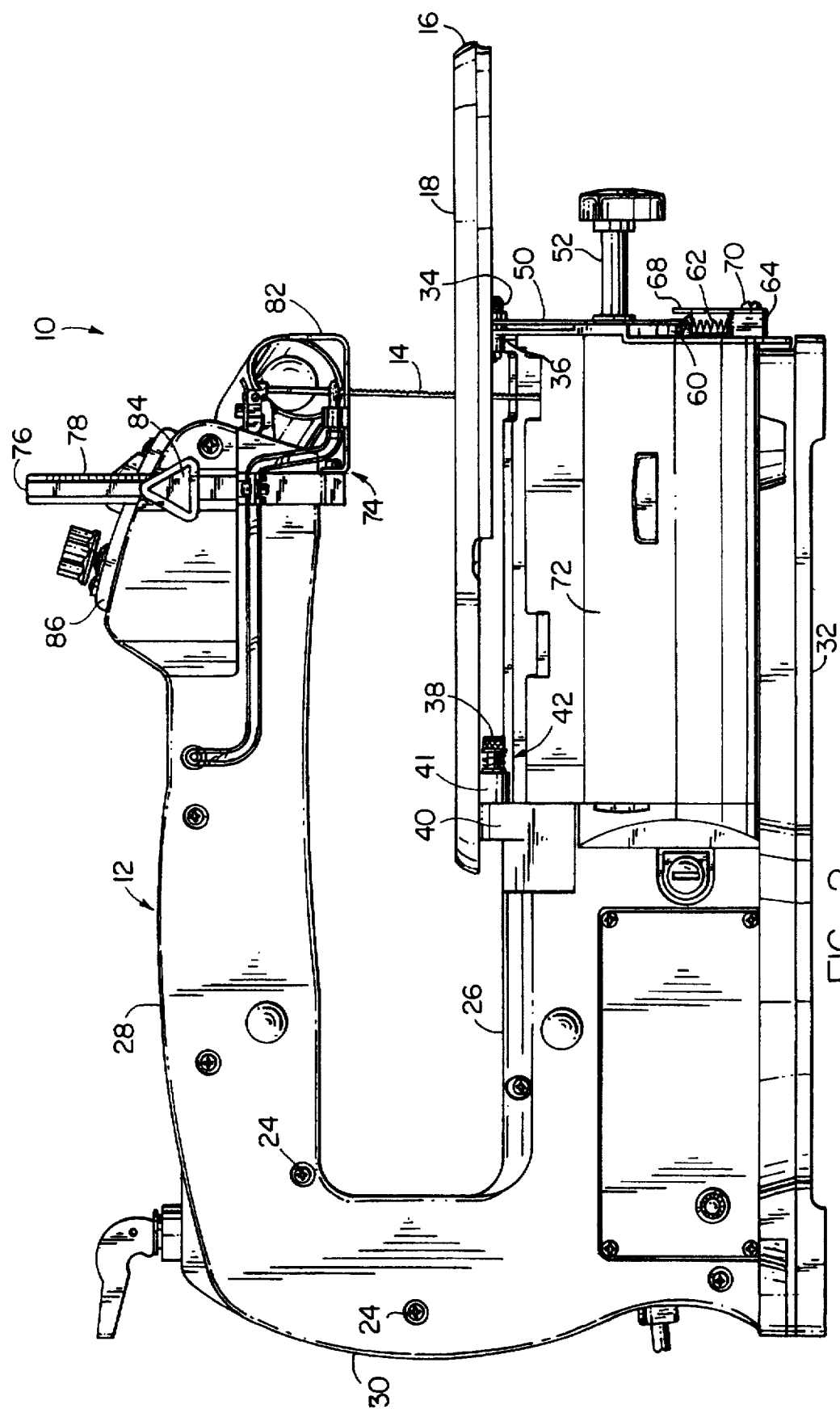
FIG. 2 is a side elevational view of the scroll saw of FIG. 1 taken from the left side of FIG. 1.

In FIGS. 1 and 2, a scroll saw embodying the present invention is indicated generally by the reference numeral 10. The scroll saw 10 comprises a frame 12, a saw blade 14 drivingly supported on the frame for cutting a workpiece "W" (shown typically in broken lines in FIG. 1), and a table 16 pivotally mounted to the frame and defining an approximately planar work surface 18 for supporting the workpiece W. The table 16 and work surface 18 define a left side extending laterally on one side of the frame and a right side extending laterally on the opposite side of the frame, and as indicated in broken lines in FIG. 3, both the left and right sides of the table are preferably tiltable in opposite directions about a 0° plane oriented approximately perpendicular to the axis of the saw blade. As described in further detail below, each side of the table 16 is tiltable downwardly through a lower angular segment of approximately 45° in order to tilt the table and workpiece at any of various angular orientations relative to the saw blade.

As shown in FIG. 1, the frame 12 includes a first frame section 20 and a second frame section 22 which is fixedly attached to the first frame section by a plurality of fasteners 24 (FIGS. 1 and 2) to thereby define a frame assembly forming a hollow interior for mounting various components of the scroll saw 10. As shown best in FIGS. 1 and 2, the frame assembly defines a lower leg 26, an upper leg 28 spaced above and extending parallel to the lower leg, and a rear leg 30 extending between and connecting the upper and lower legs. A base 32 of the frame is fixedly secured to the bottom side of the lower leg 26 to support the scroll saw on a suitable support surface.

Figure 3:
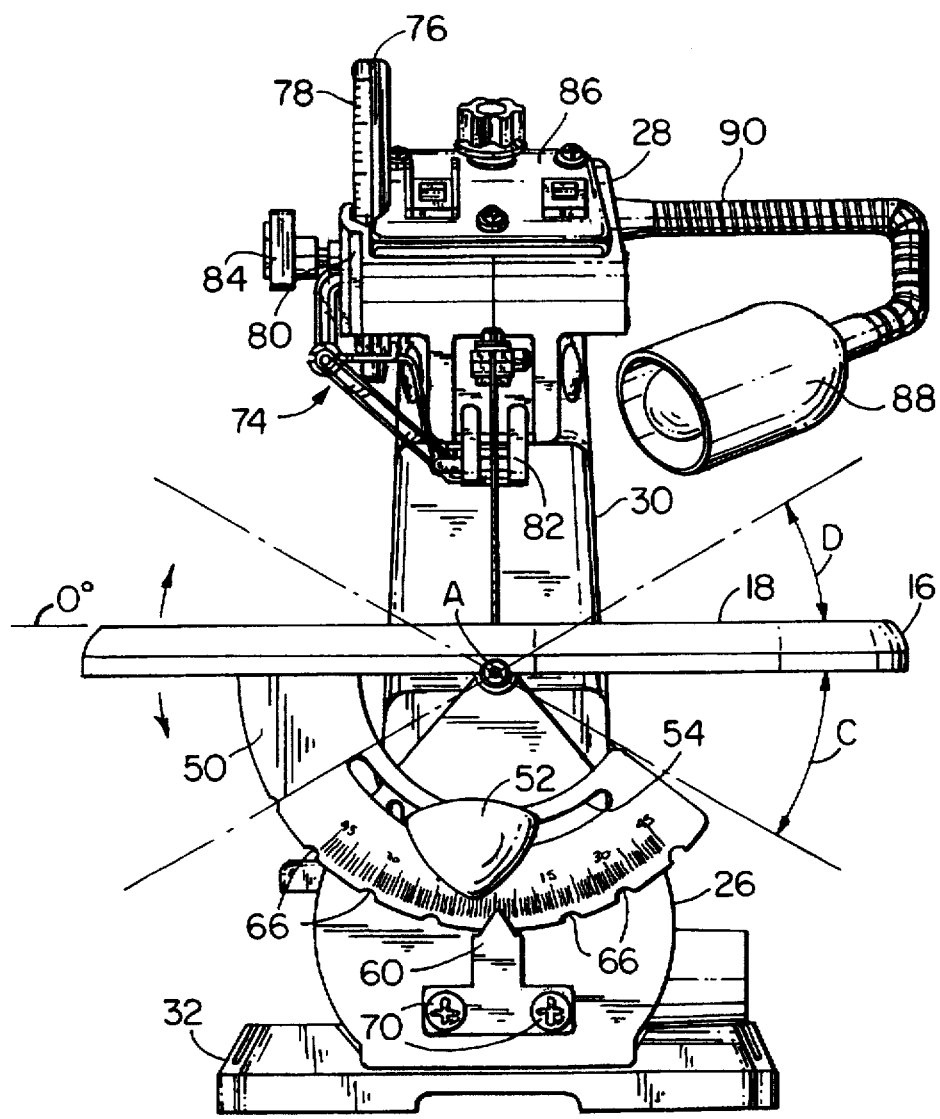
FIG. 3 is front elevational view of the scroll saw of FIG. 1.

As shown in FIG. 2, the table 16 is pivotally mounted by a first fastener 34 to a front pivot mount 36 formed on the first frame section 20, and is pivotally mounted by a second fastener 38 to a rear pivot mount 40 formed on the second frame section 22. The table 16 includes a rear mounting flange 41 for receiving the second fastener 38, and a coil spring and washer assembly 42 is seated between the second fastener 38 and rear pivot mount 40 to adjust the friction applied by the fastener to the table, and to thereby adjust the frictional resistance of the table to pivotal movement. As shown in FIG. 3, the front and rear pivot mounts 36 and 40, respectively, define a pivot axis "A" about which the table 16 and work surface 18 are tiltable in opposite directions about the 0° plane.

Figure 4:
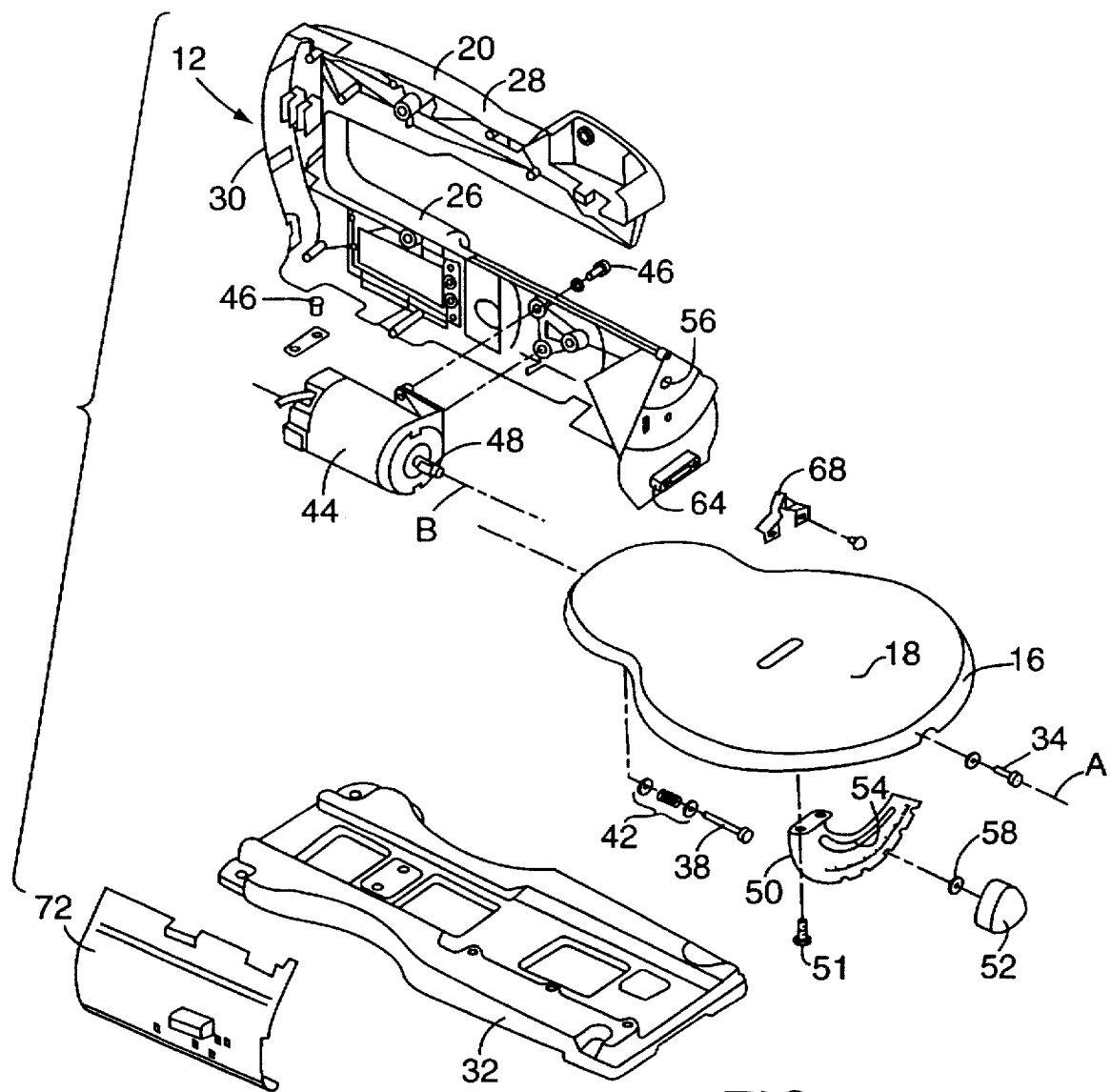
FIG. 4 is an exploded perspective view of the scroll saw of FIG. 1 with parts removed for clarity.

As shown in FIG. 4, an electric motor 44 is fixedly secured to both the lower leg 26 and base 32 of the frame by suitable fasteners, shown typically at 46. The motor 44 includes a rotatably-driven shaft 48, which in turn defines an axis of rotation or motor axis "B". In order to reduce noise and vibrations in the drive train, the motor axis "B" is preferably oriented approximately parallel to, and in line with the pivot axis "A" of the table 16. Preferably, the motor axis "B", the pivot axis "A", and the axis of the saw blade 14 are substantially located in approximately the same plane.

The scroll saw 10 further includes means for locking or fixedly securing the position of the work surface 18 relative to the saw blade 14 (and the 0° plane). As shown in FIGS. 3 and 4, an angular adjustment member 50 is connected to the underside of the table 16 by suitable fasteners, shown typically at 51 (FIG. 4), and is coupled to the front face of the frame 12 by an adjustment handle or knob 52. The angular adjustment member 50 defines a curved slot 54 for receiving the threaded end of the adjustment knob 52. As shown best in FIG. 4, the knob 52 is in turn threadedly attached to a boss 56 formed on the front face of the lower leg 26, and a washer 58 is seated between the knob and adjustment member. The knob 52 is rotated into engagement with the washer and angular adjustment member to fixedly secure or lock the adjustment member, and thus lock the angular position of the table in place, and is rotated away from the adjustment member to release and in turn adjust the angular position of the table, as is described further below.

The scroll saw 10 further includes means for stopping the work surface 18 in each of a plurality of select angular positions relative to the blade 14 (and the 0° plane) in response to pivotal movement of the work surface in order to facilitate positioning the work surface in a desired angular position. As shown best in FIG. 2, a stop member 60 is mounted on the frame 12 below the angular adjustment member 50, and means are provided for biasing or urging the stop member into engagement with the angular adjustment member for stopping the adjustment member and work surface in the select angular positions. In the embodiment of the present invention illustrated, the biasing means includes a coil spring 62 seated between the stop member 60 and a support flange 64 formed on the front face of the frame's lower leg 26, and the coil spring 62 normally urges or biases the stop member into engagement with the lower edge of the adjustment member. As will be recognized by those skilled in the pertinent art, the illustrated means for biasing is only exemplary, and numerous other means for biasing or urging the stop member into engagement or contact with the adjustment member may equally be employed.

As shown best in FIG. 3, the adjustment member 50 further defines a plurality of stop surfaces 66 angularly spaced relative to each other on the lower edge of the adjustment member, and each stop surface defines a respective position of the work surface relative to the blade 14 (and the 0° plane). In the embodiment of the present invention illustrated, each stop surface 66 is defined by a recess, and each recess defines a curvature approximately conforming to the curvature of the free end of the stop member 60 for receiving the stop member. As also shown, the free end of the stop member 60 preferably defines an approximately hemispherical or convex shape, and each recess 66 defines an approximately concave shape for receiving the stop member.

Accordingly, when the table 18 is tilted in either direction about the 0° plane, the lower edge of the adjustment member 50 slides in engagement with the stop member 60, and the stop member progressively engages each stop surface 66. When the stop member is urged by the coil spring into contact with the stop surface of each recess, a click or snap-like sound is generated, to notify or otherwise signal the operator that the table is located and positioned in the respective angular position. The operator may then continue to tilt the table until the stop member engages the desired stop surface, or until the table is otherwise located in the desired angular position. The rounded configurations of the stop member 60 and recesses 66 are advantageous insofar as the stop member frictionally engages each recess to thereby stop or inhibit movement of the adjustment member and facilitate the positioning of the table in each select angular position; however, the stop member does not become interlocked with the recesses, nor does it otherwise prevent further pivotal movement of the table when engaged within a recess. Once the desired angular position of the table is set, the adjustment knob 52 is then rotated into engagement with the washer 58 and adjustment member 50 to lock the table in place.

In the embodiment of the present invention illustrated, the recesses are spaced approximately 15° relative to each other and define pre-set angular positions of 0° and 15° left, 30° left, 45° left, 15° right, 30° right, and 45° right relative to the 0° plane. These are believed to be the more commonly-used, and therefore the most advantageous pre-set angular positions. However, as will be recognized by those skilled in the pertinent art, these select angular positions may be changed, if desired, and additional or fewer recesses may be provided. As will also be recognized by those skilled in the pertinent art, the illustrated shapes and configurations of the stop surfaces and stop member are exemplary, and numerous other shapes and configurations may equally be employed to facilitate locating and positioning the table in the select angular positions. For example, the stop surfaces 66 may be formed by a plurality of raised surface areas, and the stop member 60 may in turn define a recessed surface area for receiving each raised surface area to thereby stop the angular adjustment member and table in the select angular positions.

The scroll saw 10 further includes means for indicating the angular position of the work surface relative to the 0° plane (or the axis of the saw blade). As shown in FIG. 3, the angular adjustment member 50 defines on its front face a graduated scale with numerical indicia for identifying with reference to the graduations the angular position of the table relative to the 0° plane. A pointer 68 is mounted to the flange 64 by suitable fasteners 70, and extends over the lower edge of the adjustment member 50 adjacent to the graduations of the scale in order to mark the angular position of the table on the scale. Once the desired angular position of the table is set, as indicated by the pointer 68 and graduated scale, the adjustment knob 52 may be rotated into engagement with the angular adjustment member 50 to lock the adjustment member and table in place.

As shown in FIG. 3, the left and right sides of the table 18 are each tiltable downwardly from the 0° plane within a respective lower angular segment "C" of approximately 45°, and are each tiltable upwardly from the 0° plane within a respective upper angular segment "D" of approximately 45°. The table 18 may therefore be tilted in opposite directions about the 0° plane and fixed in any desired angular position within its range of angular movement defined by the angular segments "C" and "D". As will be recognized by those skilled in the pertinent art, although each of the upper and lower angular segments "C" and "D" of the scroll saw 10 are preferably at least approximately 45° in order to allow each side of the table to be tilted to any position throughout an angular adjustment range of 0° through 45, each angular segment may be increased or decreased as desired.

The motor 44 is preferably mounted within the frame 12, and drivingly connected to the saw blade 14 in the same manner as disclosed in the co-pending patent application entitled "SCROLL SAW HAVING A TABLE TILTABLE IN OPPOSITE DIRECTIONS ABOUT A HORIZONTAL PLANE", which is being filed on even date herewith, is assigned to the Assignee of the present invention, and is hereby expressly incorporated by reference as part of the present disclosure.

As also described in the above-mentioned patent application, the scroll saw 10 preferably includes a storage compartment (not shown) formed within the lower leg 26 of the frame 12 below the table 16, and as shown in FIGS. 1 and 2, a cover 72 is pivotally mounted to the base 32 of the frame to open and close the compartment. The cover 72 preferably includes mounting flanges, or like mounting means (not shown) on its inner side for mounting spare saw blades and/or a blade wrench for adjusting or replacing the blades.

The scroll saw 10 preferably also includes a hold-down guard and integral depth scale assembly 74 for contacting and indicating the thickness of a workpiece and for preventing upward movement of the workpiece during a cutting operation. A support bar 76 bearing a depth scale 78 is slidably retained within a bracket 80 mounted on the upper leg 28 of the frame adjacent to the saw blade. A hold-down guard 82 is fixedly secured to the lower end of the support bar, and a threaded knob 84 is received through the bracket 80 to fix the support bar and hold-down guard in place.

During set up of the scroll saw 10, a workpiece "W" is seated on the work surface 18 of the table, as shown typically in broken lines in FIG. 1, and the knob 84 is rotated to release the support bar 76 and thereby permit the hold-down guard to be lowered into contact with the upper surface of the workpiece. When the hold-down guard is brought into contact with the workpiece "W", the scale 78 and the upper or indexing edge of the bracket 80 identify or confirm the thickness of the workpiece based on the graduations and indicia either aligned with, or located immediately adjacent to the indexing edge. The knob 84 is then rotated into engagement with the support bar 76 to fix the position of the support bar, and thus fix the position of the hold-down guard in the desired position for performing a cutting operation. The graduations and numerical indicia are applied to the scale 78, and the scale is applied to the support bar 76 in a manner known to those of ordinary skill in the pertinent art so that the graduations and indicia aligned with the indexing edge of the bracket 80 indicate the distance or depth "D" between the hold-down guard 82 and work surface 18.

As shown in FIG. 1, a control panel 86 is mounted to the forward end of the upper leg 28 of the frame and includes appropriate control knobs and switches for controlling the actuation and speed, if desired, of the motor 44. A lamp 88 including a gooseneck support 90 is also mounted on the forward end of the upper leg 28 of the frame for illuminating the work station defined by the saw blade 14 and work surface 18.

As will be recognized by those skilled in the pertinent art, numerous changes and modifications may be made to the above-described and other embodiments of the present invention without departing from its scope as defined in the appended claims. For example, the table 18 may be mounted in a more conventional configuration such that only one side of the table is tiltable in opposite directions about the 0° plane. Similarly, the angular adjustment member and stop member may each take any of numerous different shapes and/or configurations, and may likewise be mounted on the scroll saw in a different location than described above. Accordingly, this detailed description of a preferred embodiment is to be taken in an illustrative, as opposed to a limiting sense.

What is claimed is:

1. A scroll saw, comprising:

a frame;

an axially-elongated saw blade drivingly supported on the frame for cutting a workpiece;

an approximately planar work surface pivotally mounted on the frame adjacent to the saw blade for supporting the workpiece, and tiltable relative to the saw blade;

an angular adjustment member coupled between the work surface and the frame and defining a plurality of stop surfaces, each stop surface being angularly spaced relative to the other stop surfaces and defining a respective position of the work surface relative to the blade;

a stop member mounted adjacent to the angular adjustment member and engageable with each stop surface for stopping the adjustment member and work surface in a desired respective position relative to the blade; and an adjustment handle coupled between the angular adjustment member and the frame, and engageable with the angular adjustment member for locking the adjustment member and work surface in any angular position to which they may be tilted relative to the saw blade.

2. A scroll saw as defined in claim 1, wherein each stop surface is defined by a respective recess formed in the angular adjustment member.

3. A scroll saw as defined in claim 1, wherein the angular adjustment member defines a curved edge, and each recess is formed on the curved edge.

4. A scroll saw as defined in claim 1, further comprising a biasing member coupled to the stop member and urging the stop member into engagement with the stop surfaces of the angular adjustment member.

5. A scroll saw as defined in claim 4, wherein the biasing member is a coil spring.

6. A scroll saw as defined in claim 1, wherein the stop member defines a curved surface engaging the adjustment member, and each stop surface defines a curvature substantially conforming to the curved surface of the stop member.

7. A scroll saw as defined in claim 6, wherein the curved surface of the stop member is approximately convex, and each stop surface of the angular adjustment member is approximately concave.

8. A scroll saw as defined in claim 1, wherein the work surface defines a first side extending laterally on one side of the blade, and a second side extending laterally on an opposite side of the blade, and each of the first and second sides is tiltable downwardly from an approximately 0° plane.

9. A scroll saw as defined in claim 8, wherein each of the first and second sides of the work surface is tiltable downwardly from the 0° plane within a lower angular segment of approximately 45°.

10. A scroll saw as defined in claim 1, wherein the stop surfaces of the angular adjustment member define predetermined positions of the work surface selected from the group including: 45° left, 30° left, 15° left, 0°, 15° right, 30° right and 45° right.

11. A scroll saw as defined in claim 10, further comprising:

a graduated scale located on the angular adjustment member, wherein each graduation defines a respective angular position of the work surface; and an index mounted adjacent to the graduated scale and indicating the angular position of the work surface on the scale.

12. A scroll saw, comprising in combination:

a frame;

an axially-elongated saw blade drivingly supported on the frame for cutting a workpiece;

an approximately planar work surface pivotally mounted on the frame adjacent to the saw blade for supporting the workpiece, and pivotable relative to the saw blade;

an angular adjustment member coupled between the work surface and frame and movable with the work surface relative to the frame, and including a plurality of stop surfaces, each stop surface defining a respective angular position of the work surface;

a stop member mounted adjacent to the angular adjustment member and biased toward engagement with each of the plurality of stop surfaces in response to movement of the adjustment member with the work surface to thereby stop the adjustment member and work surface in the respective angular positions; and means for locking the position of the work surface relative to the saw blade in any position to which the work surface may be pivoted.

13. A scroll saw as defined in claim 12, further comprising means for urging the stop member into engagement with each of the plurality of stop surfaces.

14. A scroll saw as defined in claim 12, wherein each stop surface is defined by a respective recess formed in the angular adjustment member.

15. A scroll saw as defined in claim 12, wherein the stop member defines a curved surface engaging the angular adjustment member, and each stop surface defines a curvature conforming to the curved surface of the stop member.

16. A scroll saw as defined in claim 12, wherein the select angular positions are selected from the group including: 45° left, 30° left, 15° left, 0°, 15° right, 30° right and 45° right.

17. A scroll saw as defined in claim 12, further comprising means for indicating the angular position of the work surface relative to an approximately 0° plane.

18. A scroll saw as defined in claim 12, wherein the work surface defines a first side located on one side of the blade, and a second side located on an opposite side of the blade, and the scroll saw further includes means for tilting the first and second sides of the work surface in opposite directions about an approximately 0° plane.

* * * * *